United States Patent
Cheah

(10) Patent No.: US 7,677,754 B2
(45) Date of Patent: Mar. 16, 2010

(54) DIRECTIONAL INPUT DEVICE WITH KNOB

(75) Inventor: Chiang Sun Cheah, Penang (MY)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 957 days.

(21) Appl. No.: 11/403,260

(22) Filed: Apr. 13, 2006

(65) Prior Publication Data

US 2007/0242060 A1    Oct. 18, 2007

(51) Int. Cl.
*G06F 3/033* (2006.01)

(52) U.S. Cl. .................... 362/184; 345/167; 463/36

(58) Field of Classification Search ......... 345/161–168, 345/184; 463/36–38
See application file for complete search history.

(56) References Cited

U.S. PATENT DOCUMENTS

| | | | |
|---|---|---|---|
| 6,633,930 B2 * | 10/2003 | Sonehara et al. ............ 710/62 |
| 7,084,856 B2 * | 8/2006 | Huppi ........................ 345/163 |
| 2003/0076303 A1 | 4/2003 | Huppi | |
| 2005/0176504 A1 * | 8/2005 | Stanley ........................ 463/37 |
| 2006/0025217 A1 * | 2/2006 | Hussaini et al. ............ 463/36 |
| 2006/0071917 A1 * | 4/2006 | Gomez et al. ............... 345/184 |
| 2008/0032796 A1 * | 2/2008 | Matsuyama et al. ........... 463/37 |

OTHER PUBLICATIONS

Agilent AEDR-800 Series Encoders Reflective Surface Mount Optical Encoder Data Sheet [online] Retrieved Feb. 2006; Retrieved from: http//www.avagotech.com/pc/downloadDocument.do?id=5165)10 pages.

* cited by examiner

*Primary Examiner*—Richard Hjerpe
*Assistant Examiner*—Kimnhung Nguyen

(57) ABSTRACT

A controller with a dial for manipulating objects in a computer environment. The dial is in communication with an optical encoder system using the reflective method. A knob is attached to the dial and provides both a reference point for the rotational position of the dial and a tactile element allowing the user to rotate the dial.

19 Claims, 2 Drawing Sheets

DIRECTIONAL INPUT DEVICE WITH KNOB

TECHNICAL FIELD

The present application relates generally to a controller for manipulating objects in a computer application. More particularly, the present application relates to a controller dial that uses the reflective method to measure dial direction and speed.

BACKGROUND OF THE INVENTION

Computer controllers generally include a base unit that may house various buttons, pads, and dials. Examples of common controllers include computer mice, keyboards, audio/visual remote controls, joysticks, home game system controllers, the buttons on handheld devices, and steering wheel-style video game controllers. Users manipulate the various controller buttons, pads, and dials and the controllers produce changes to the computer application. A variety of controllers use dials, such as rotary dials on computer mice, rotary dials to simulate steering wheels on racing games, and rotary dials on audio/visual equipment to manipulate searching, volume, etc.

The various dials mentioned above have unfortunate drawbacks. The movement speed and direction of the dials are often measured with mechanical or optical encoders that are bulky. Similarly, the dials do not have a protruding knob to facilitate movement of the dial and/or to serve as a reference point for the relative dial position. Thus, if the user picks up his finger from the dial, the zero reference point of the dial is difficult to locate. Similarly, without a knob, the finger may slip off of the dial during use. In the case of video game steering wheel controllers, the controllers, which are actual steering wheels connected to a base by a column, are often bulky and do not work well in small environments such as with handheld game devices.

BRIEF SUMMARY OF THE INVENTION

The embodiments of the present invention are directed to a controller for manipulating objects in a computer application. The controller comprises a base with a dial rotatably attached to the base. The dial comprises a knob attached to the dial to provide a reference point for the rotational position of the dial. An optical encoder system is in operable communication with the dial using the reflective method. The dial in conjunction with the optical encoder system provides a manipulation function for objects in a computer application.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
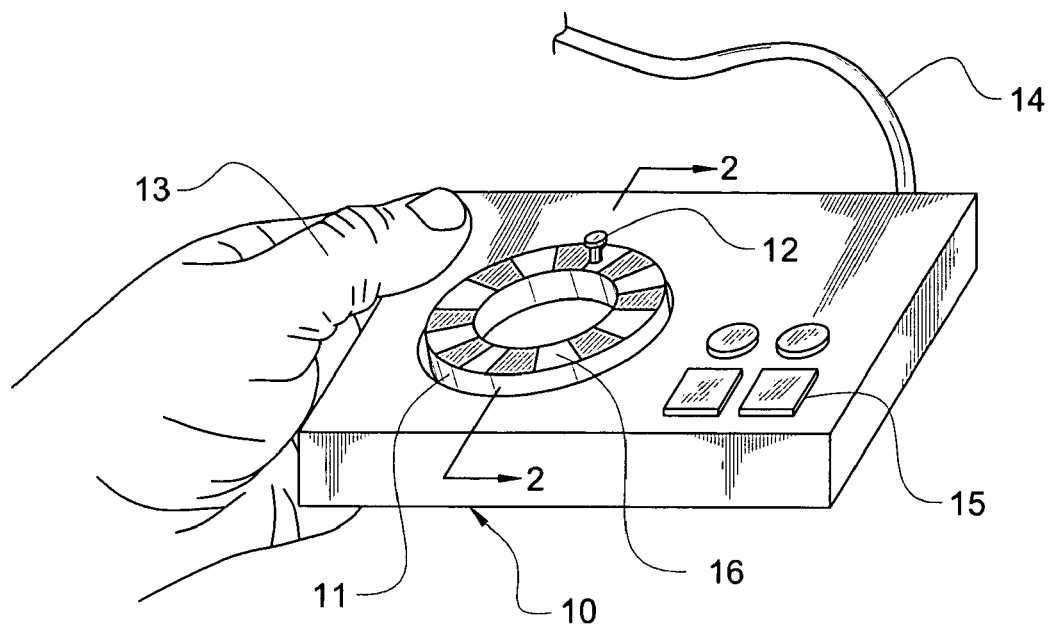
FIG. 1 is a perspective view of an embodiment of the present invention.
Figure 2:
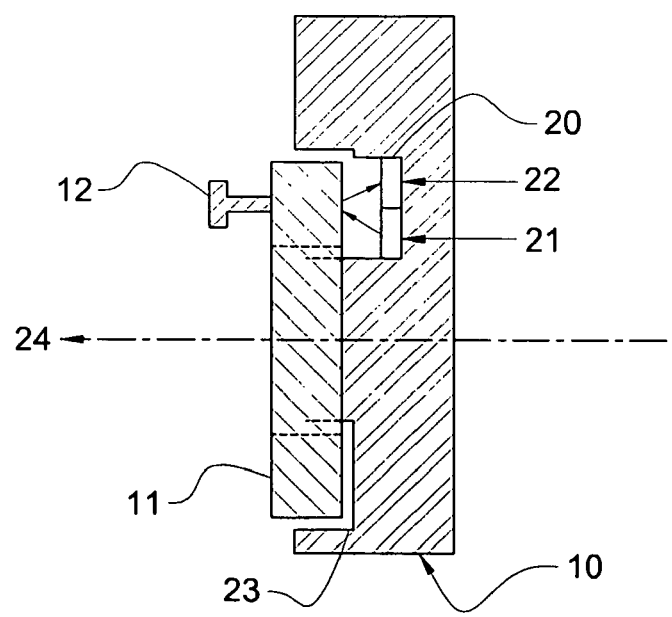
FIG. 2 is a cross-sectional view of the embodiment of FIG. 1 taken along line 2-2 of FIG. 1.

Referring now to FIGS. 1 and 2, an embodiment of the present invention comprises a base 10. Dial 11 is rotatably attached to base 10 and rotates about an axis defined by line 24 in FIG. 2. Dial 11 has an outward face 16 that faces away from base 10. Dial 11 supports knob 12. Knob 12 provides a tactile element with which to rotate dial 11 and/or serves as a reference point for the relative rotational position of dial 11.

Figure 4:
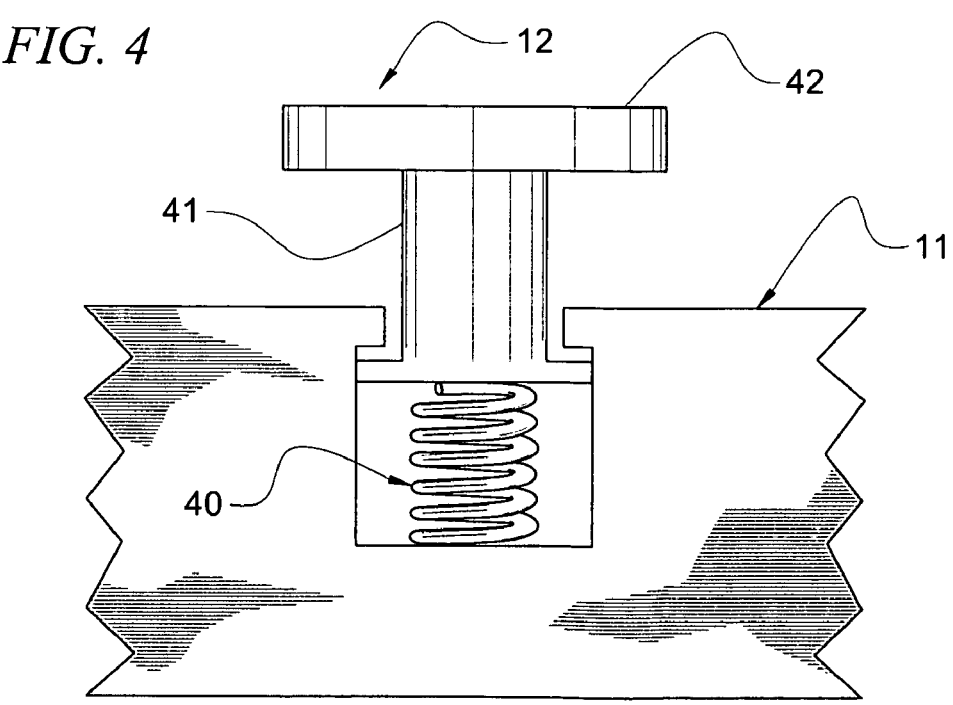
FIG. 4 is a detail view of a portion of an embodiment of the present invention.

Referring to FIGS. 1 and 4, knob 12 is collapsible so as to allow the user to retract it when dial 11 is not in use. Knob 12 is preferably spring loaded by spring 40 which pushes knob 12 to an elevated position as shown in FIG. 4. Knob 12 may be retracted by applying force downward against spring 40 at which point a conventional locking mechanism holds the knob downward until the next use. Knob 12 can be retracted when dial 11 is not in use so that the knob is protected against damage. Various configurations are within the scope of the invention. For example, knob 12 may be retracted by folding or twisting.

In one embodiment, knob 12 comprises shaft 41 that is perpendicular to outward face 16 of dial 11. On the distal end of shaft 41, that is, the end farther from dial 11, a pad 42 is attached perpendicular to shaft 41. Pad 42 may be of any shape or size, but in one embodiment it is a circular pad. Thus, the user may place a finger or thumb 13 to the side of pad 42 or shaft 41 or on top of pad 42. The user may also grip pad 42 or shaft 41 with more than one finger, such as by pinching.

Dial 11 is preferably sized so as to be easily manipulatable by a user's thumb or finger 13. Finger 13 rotates dial 11 by pushing or pulling knob 12. More than one finger may be used on knob 12. Knob 12 is particularly advantageous in that it allows the user to sense the reference point of dial 11 without having to look at the dial. Further, knob 12 provides an advantageous source of fine finger control of dial 11. Dial 11 is preferably continuously rotatable in either direction. Base 10 may be connected to a computer by chord 14. In another embodiment, base 10 may communicate with the computer through wireless technology. In another embodiment, the controller and the computer are together in one unit, such as with a handheld device. Base 10 may comprise other buttons, dials, keys, or the like as represented by 15.

Dial 11 provides a manipulation function for objects in a computer application. The manipulation function may be, for example, scrolling through data in a computer application, zooming in or out of a display, or turning or moving an object or character in a video game. Note that other manipulation functions are possible. Although not shown, base 10 also typically houses electronic circuits and the like for transmitting data from dial 11 and other buttons to the computer application.

Dial 11 may be placed in various locations on base 10. Dial 11 has a major plane defined by the plane of rotation. Typically, dial 11 will be embedded in base 10, and typically, the major plane of dial 11 is parallel to the surface of base 10 on which dial 11 is embedded.

Dial 11 may be in various shapes. Dial 11 is preferably hollow (i.e. in the shape of an annulus or ring) or may be a solid disk. Outward face 16 of dial 11 is preferably flat, but may be, for example, curvilinear or polygonal.

Referring now to FIG. 2, dial 11 is preferably embedded in base 10 within recess 23. Dial 11 may be recessed to varying degrees. For example, dial 11 may be recessed such that nothing but knob 12 extends beyond the surface of base 10. Preferably, only a small portion of dial 11 extends beyond the surface of base 10 to keep the controller compact and to protect dial 11.

Figure 3:
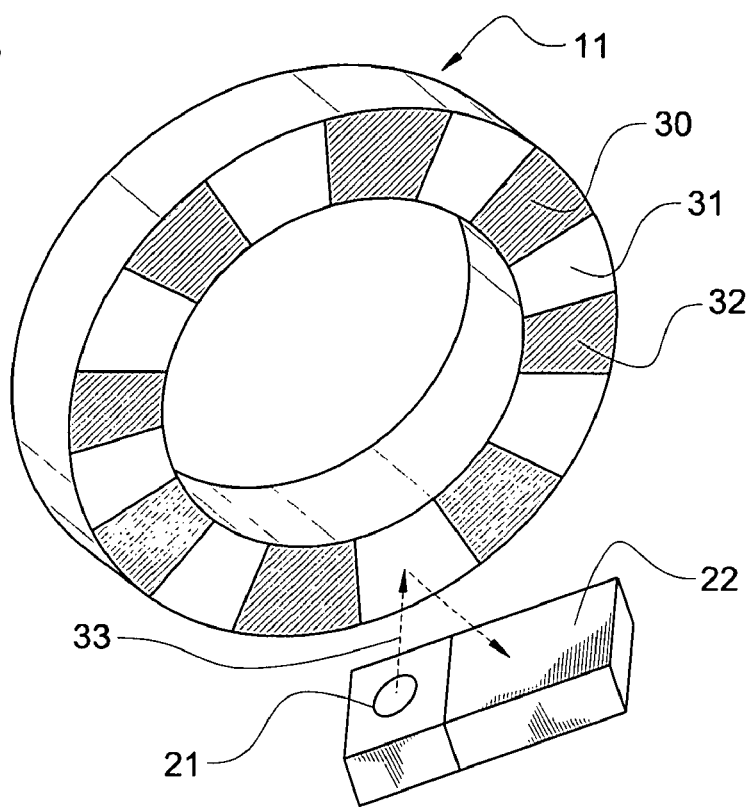
FIG. 3 is a perspective view of a portion of an embodiment of the present invention.

Referring now to FIGS. 2 and 3, optical encoder system 20 measures the direction and speed of dial 11. Optical encoder system 20 preferably uses the reflective method which saves space compared to other optical or mechanical systems. Optical encoder system 20 comprises an illuminating source 21 and a light sensor 22. Illuminating source 21, typically a light emitting diode, is preferably juxtaposed with light sensor 22 and emits light 33 in the direction of dial 11. Dial 11 comprises optically reflective material 30 on the surface facing illuminating source 21 such that light 33 is reflected back toward light sensor 22.

Optically reflective material 30 on dial 11 has intermittent reflective areas 31 and non-reflective areas 32, preferably evenly spaced apart. The operation of optical encoder system 20 is based on the principle of optics where light sensor 22 photodiodes sense the absence and presence of light. In this case, the rotary motion of dial 11 is converted into a light pattern via intermittent reflective areas 31 of optically reflective material 30 on dial 11. The alternating light and dark pattern from optically reflective material 30 falls on the photodiodes of light sensor 22 as dial 11 rotates. The moving light pattern is exploited by the light sensor circuitry to produce digital outputs representing the rotation of dial 11.

Light sensor 22 receives reflected light 33 and the information is transmitted and translated into computer instructions regarding speed and direction of dial 11. As descried above, speed is generally measured by the frequency of light bursts. Direction is determined using a standard quadrature (offset by one-fourth of a cycle) two channel output. Two channel output allows optical encoder system 20 to determine direction because light sensor 22 recognizes which of the two channels is reflected first, which depends on the direction of rotation. Internal circuitry (not shown) converts direction and speed information from optical encoder system 20 to the computer application.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A controller for manipulating an object in a computer application comprising:
   a base;
   a dial rotatably attached to the base so that the dial can be rotated about a rotational axis, the dial having an outward face, the dial allowing manipulation of the object in the computer application;
   an optical encoder system in operable communication with the dial using reflection; and
   a knob attached to the dial that protrudes from the outward face of the dial providing a reference point for the rotational position of the dial, the knob including an upper surface that has a smaller surface area than the outward face of the dial, the knob being positioned on the dial at a distance from the rotational axis of the dial such that the knob does not intersect the rotational axis of the dial,
   wherein the knob is collapsible so that the distance between the upper surface of the knob and the outward face of the dial is reduced.

2. The controller of claim 1 wherein the manipulation corresponds to scrolling.

3. The controller of claim 1 wherein the manipulation corresponds to turning.

4. The controller of claim 1 wherein the manipulation corresponds to zooming.

5. The controller of claim 1 wherein the dial is shaped as an annulus.

6. The controller of claim 1 further comprising a spring that biases the knob in an elevated position.

7. The controller of claim 1 wherein the knob folds down to retract.

8. The controller of claim 1 wherein the dial is substantially flat.

9. The controller of claim 1 wherein the dial is embedded in the base.

10. The controller of claim 9 wherein the dial has a major plane that is substantially parallel to the outer surface of the base on which the dial is embedded.

11. The controller of claim 1 wherein the dial is continuously rotatable in each direction.

12. The controller of claim 1 wherein the base comprises a game console.

13. The controller of claim 1 wherein the base comprises a game controller.

14. The controller of claim 1 wherein the base comprises a mouse.

15. The controller of claim 1 wherein the optical encoder system comprises an illuminating source, a light sensor, and optically reflective material.

16. The controller of claim 15 wherein the optically reflective material is attached to the dial.

17. The controller of claim 15 wherein the illuminating source is a light emitting diode.

18. The controller of claim 15 wherein the light sensor detects both speed and direction of the dial.

19. A controller for manipulating an object in a computer application comprising:
   a base;

a substantially flat dial that is rotatably attached to said base so that the dial can be rotated about a rotational axis, the dial having an annular outward face, the dial allowing a manipulation of the object in the computer application;

an optical encoder system in operable communication with the dial; and a collapsible knob attached to the dial that can protrude from the annular outward face of the dial providing a reference point for the rotational position of the dial, the knob including an upper surface that has a smaller surface area than the annular outward face of the dial, the knob being positioned on the dial at a distance from the rotational axis of the dial such that the knob does not intersect the rotational axis of the dial, wherein the collapsible knob is configured so that the distance between the upper surface of the collapsible knob and the outward face of the dial is reduced when the collapsible knob is collapsed.

* * * * *